United States Patent [19]
Poole et al.

[11] Patent Number: 5,798,767
[45] Date of Patent: Aug. 25, 1998

[54] METHOD AND APPARATUS FOR PERFORMING COLOR SPACE CONVERSION USING BLEND LOGIC

[75] Inventors: Glenn C. Poole, Fremont; Thomas J. Repa, San Carlos, both of Calif.

[73] Assignee: Rendition, Inc., Mountain View, Calif.

[21] Appl. No.: 616,881

[22] Filed: Mar. 15, 1996

[51] Int. Cl.⁶ .................................................. G06T 3/00
[52] U.S. Cl. .................................................. 345/431
[58] Field of Search ........................... 395/131; 345/153, 345/154, 431

[56] References Cited

U.S. PATENT DOCUMENTS

| | | | |
|---|---|---|---|
| 4,943,573 | 7/1990 | Taylor et al. | 395/131 |
| 5,375,193 | 12/1994 | Adams, Jr. | 395/131 |
| 5,414,529 | 5/1995 | Terada et al. | 395/131 X |
| 5,459,823 | 10/1995 | Silverbrook et al. | 395/131 |
| 5,594,467 | 1/1997 | Marlton et al. | 345/115 |

OTHER PUBLICATIONS

Microsoft Press Computer Dictionary, Second Edition, pp. 73–74, 1994.

*Primary Examiner*—Mark K. Zimmerman
*Attorney, Agent, or Firm*—Blakely, Sokoloff, Taylor & Zafman LLP

[57] ABSTRACT

A method and apparatus for performing color space conversion using blend circuitry in a graphics/video adapter is provided. Blend circuitry which is capable of blending two color values and fog circuitry which is capable of adjusting color values based on a fog factor are used. A first stage of converting a color value from $YC_rC_b$ (YUV) color space to RGB color space is performed using the fog circuitry, and a second stage of converting the color value from the $YC_rC_b$ (YUV) color space to RGB color space is performed using the blend circuitry, resulting in the generation of a converted color value.

24 Claims, 11 Drawing Sheets

METHOD AND APPARATUS FOR PERFORMING COLOR SPACE CONVERSION USING BLEND LOGIC

FIELD OF THE INVENTION

The present invention pertains to the field of processing graphics and video in a computer system. More particularly, the present invention relates to performing color space conversion using blend logic.

BACKGROUND OF THE INVENTION

Modern computer systems often include an add-in circuit card to support the processing of graphics, video, or both. Such cards can be referred to as graphics/video adapter cards or graphics/video accelerator cards. These components generally reduce the processing burden on the central processing unit (CPU) and enable the computer system to perform complex graphics and video processing functions, as may be required to support certain entertainment and multi-media applications.

Three common functions that are performed by graphics/video accelerator cards are the addition of fog effect, blending, and color space conversion. Fog effect, which is commonly used in game applications such as flight simulators, generally involves modifying an affected pixel color value according to a fog multiplier factor and a fog color value, as will be discussed in the detailed description which follows. Blending is a function by which an output pixel color value is based on two or more input pixel color values that are each scaled (weighted) according to a particular fraction. Color space conversion is generally performed to convert pixel color data in one color space to pixel color data in a different color space. Television or other video color data may be provided to a computer system in YCrCb (luminance, red chrominance, blue chrominance) color space, sometimes referred to as "YUV" color space. YCrCb is the native color space of NTSC, PAL and MPEG. However, for a computer system to display that data, it may be necessary to convert the data to a color space that is compatible with the computer's display capabilities, such as RGB (red, green, blue) color space. RGB is the native color space of many personal computers and workstations.

One problem which is commonly encountered in the design of graphics/video add-in cards is that space is usually quite limited. A solution to this problem is to reduce the number of gates in the circuitry by providing only selected graphics functions that are essential or that are required by only certain, specifically-targeted software applications. However, the importance of reducing circuit area must be weighed against the need to accommodate the demands of the marketplace. Consequently, it is desirable to reduce the overall number of gates required to implement certain graphics/video functions, such as fog, blending, and color space conversion, in a graphics/video add-in card, without sacrificing functionality.

SUMMARY OF THE INVENTION

An apparatus is described for processing color values which correspond to pixels of a display device. The apparatus comprises a memory and a blend circuit. The memory stores a number of the color values. The blend circuit is coupled to the memory and blends a first color value received from the memory and a second color value. The blend circuit also inputs a third color value which is derived from a given color space and generates a fourth color value in response to the third color value, such that the fourth color value conforms to a different color space than the given color space.

In a specific embodiment of the present invention, the given color space is $YC_rC_b$ and the different color space is RGB.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for performing color space conversion using blend logic are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
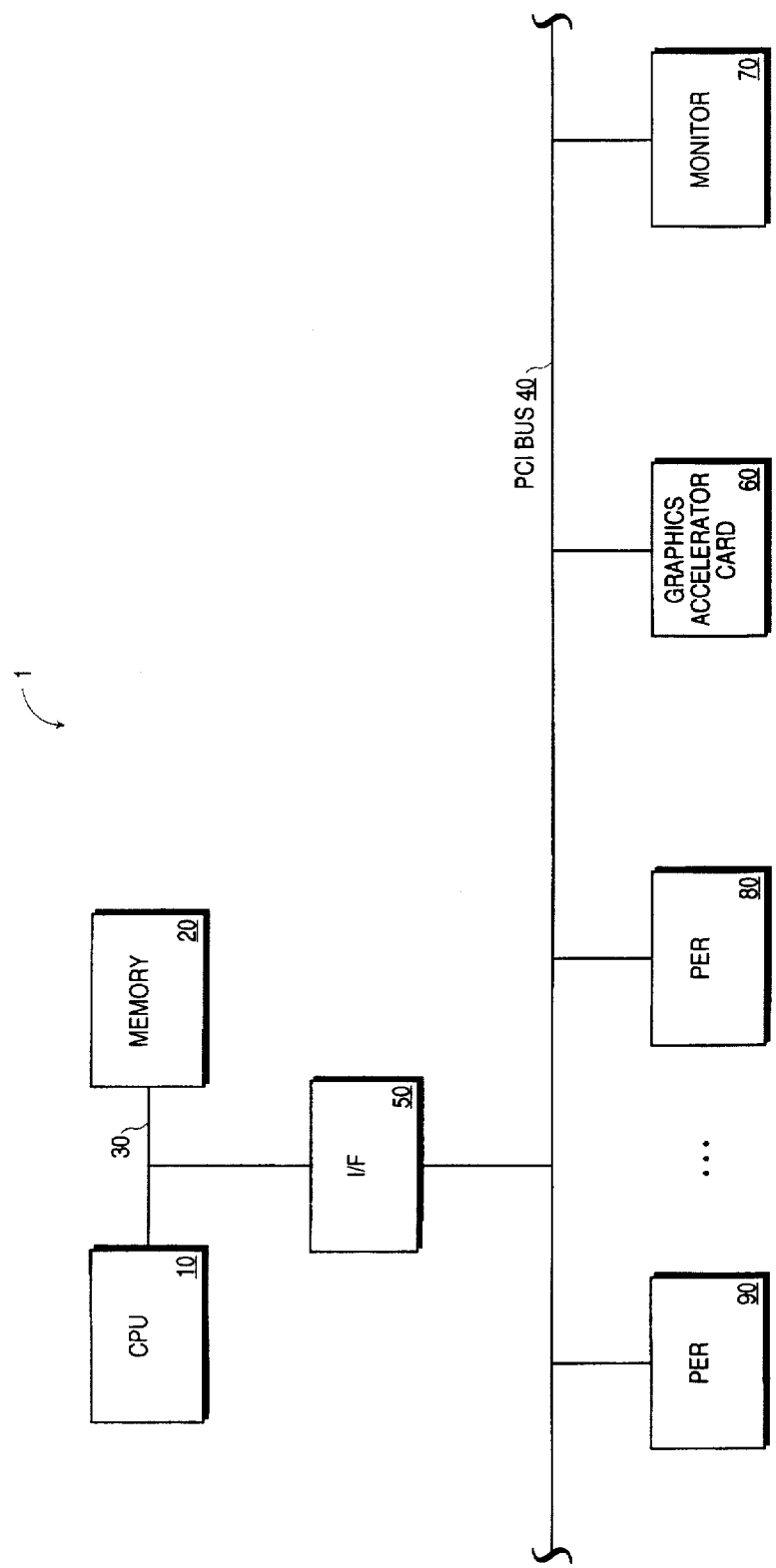
FIG. 1 illustrates a computer system in which the present invention is implemented.

FIG. 1 illustrates a computer system 1 in which the present invention is implemented. The computer system 1 includes a central processing unit (CPU) 10 coupled to system memory 20 by a system bus 30. The CPU 10 and memory 20 are coupled to a PCI (peripheral component interconnect) bus 40 through a bus interface 50 via the system bus 30. Coupled to the PCI bus 40 is a graphics/video accelerator card 60, as well as various peripheral devices 80 and 90. The graphics/video accelerator card 60 is coupled to a display monitor 70.

Figure 2:
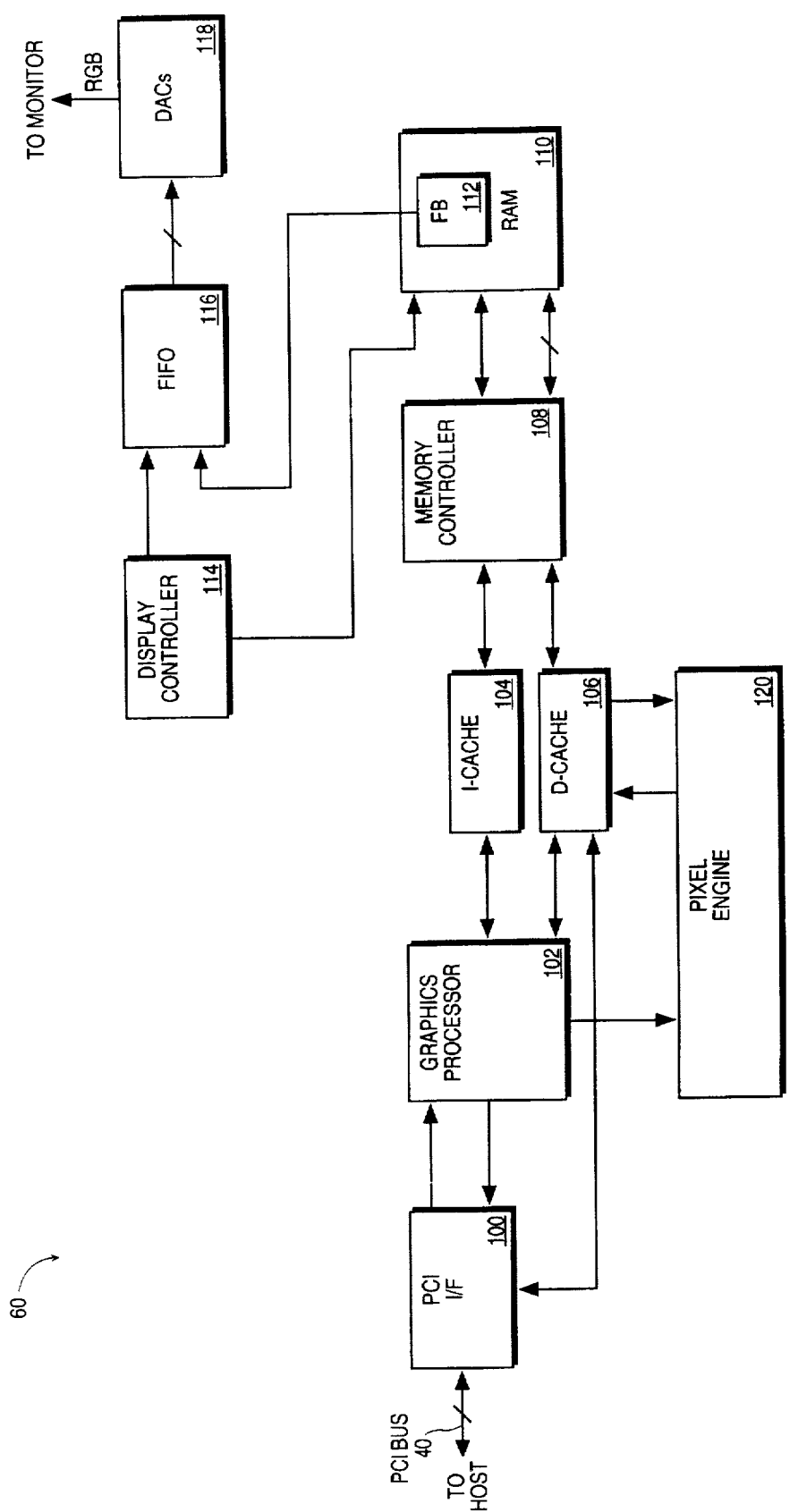
FIG. 2 illustrates graphics/video processing circuitry in which the present invention is implemented.

FIG. 2 illustrates circuitry included within the graphics/video accelerator card 60, including circuitry for performing various three-dimensional (3D) graphics function. In FIG. 2, a PCI interface 100 couples the graphics/video accelerator card 60 to the PCI bus 40. A graphics processor 102 is coupled to the PCI interface 100 and is designed to perform various graphics and video processing functions, as will described below. In the preferred embodiment, the graphics processor 102 is a RISC (reduced instruction set computing) processor.

A pixel engine 120 is coupled to the graphics processor 102 and contains circuitry for performing various graphics functions, such as bilinear filtering, fog, blending, color space conversion, dithering, etc., as will be described below. A local random access memory (RAM) 110 stores both source pixel color values and destination pixel color values. Destination color values are stored in a frame buffer 112 within memory 110. In the preferred embodiment, memory 110 is implemented using dynamic RAM (DRAM). A display controller 114 is coupled to RAM 110 and to a first-in first-out buffer (FIFO) 116. Under the control of the display controller 114, destination color values stored in frame buffer 112 are provided to FIFO 116. Destination values stored in FIFO 116 are provided to a set of digital-to-analog converters (DACs) 118, which output red, green, and blue analog color signals to monitor 70.

Also coupled to RAM 110 is a memory controller 108. Memory controller 108 controls the transfer of data between RAM 110 and both the pixel engine 120 and the graphics processor 102. An instruction cache 104 and a data cache 106 are each coupled to the graphics processor 102 and to the memory controller 108 and are used to store frequently used instructions and data, respectively. The data cache 106 is also coupled to the PCI interface 100 and to the pixel engine 120.

Figure 3:
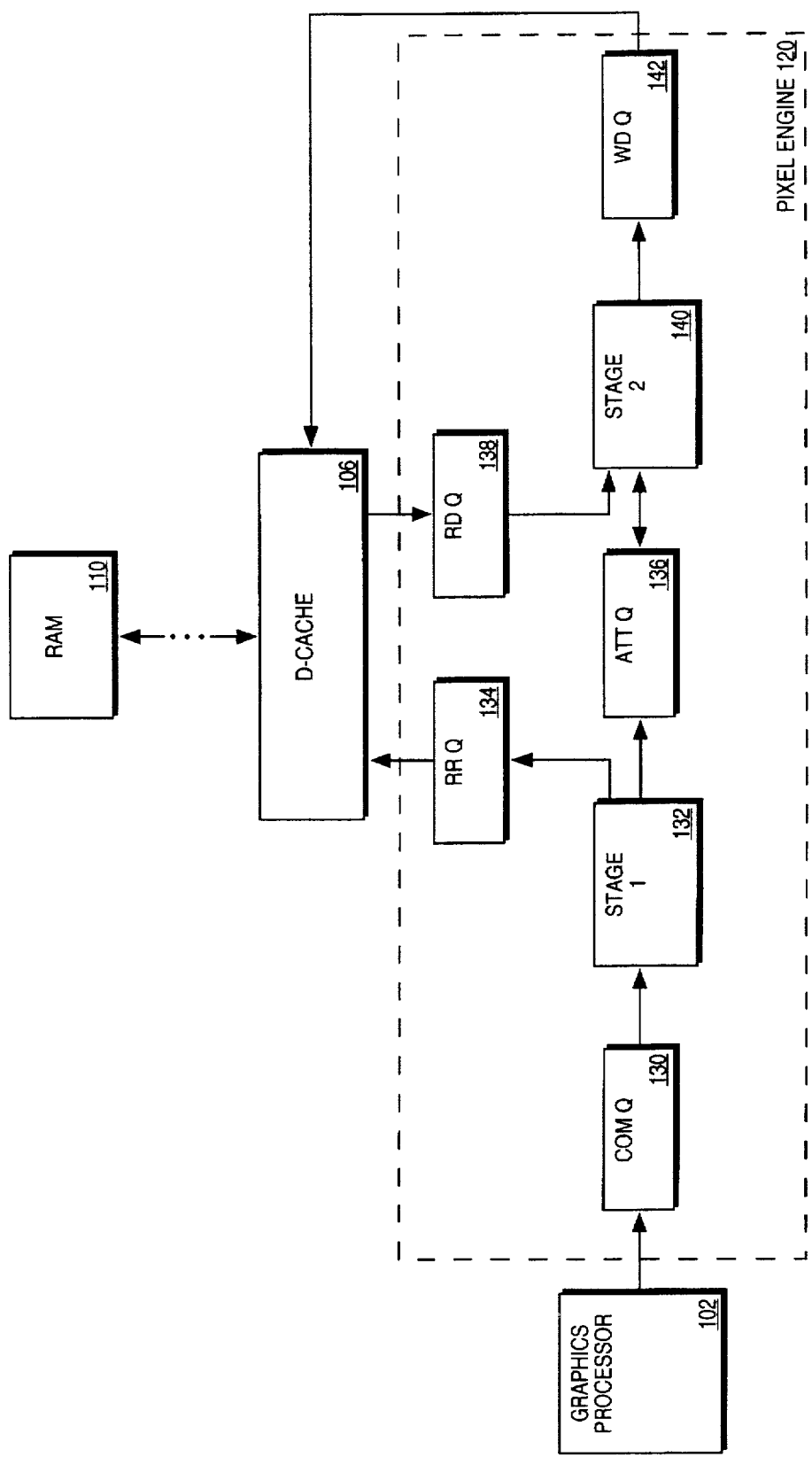
FIG. 3 illustrates a pixel engine in which the present invention is implemented.

FIG. 3 illustrates the pixel engine 120 in greater detail. The pixel engine 120 includes a command queue 130, a read request queue 134, an attribute queue 136, a read data queue 138, a write data queue 142, stage 1 processing circuitry 132, and stage 2 processing circuitry 140. Commands issued by the graphics processor 102 are received by the pixel engine 120 and stored in command queue 130. Commands stored in the command queue 130 are then provided to stage 1 circuitry 132. Stage 1 circuitry 132 accumulates pixel attributes and determines the number of read and write cycles that must be performed for each command. Pixel attributes may include, for example, x, y, and z components, R, G, and B components, alpha (transparency), u and v components, and fog. In addition, stage 1 circuitry 132 generates memory read and write requests and addresses associated with each read and write operation. Memory read requests generated by stage 1 circuitry 132 are stored in read request queue 134. Read request queue 134 then outputs each read request to the data cache 106. In addition, stage 1 circuitry 132 outputs pixel attributes to attribute queue 136, which subsequently provides the attributes to stage 2 processing circuitry 140.

During read operations, pixel color values are read from data cache 106 (the color values may originate from RAM 110) into read data queue 138. The pixel color values are then output from read data queue 138 into stage 2 circuitry 140, which performs functions including bilinear filtering, texture application, fog effect, color space conversion, blending, and dithering. Processed color values are then provided by stage 2 circuitry 140 to a write data queue 142, which then outputs the processed color values to the data cache 106.

Attribute queue 136 stores pixel attributes which are not used to look up data in data cache 106 or RAM 110. When data is read from data cache 106 into stage 2 circuitry 140, the corresponding attribute values stored in attribute queue 136 are read out in parallel from attribute queue 136 to stage 2 circuitry 140.

Figure 4:
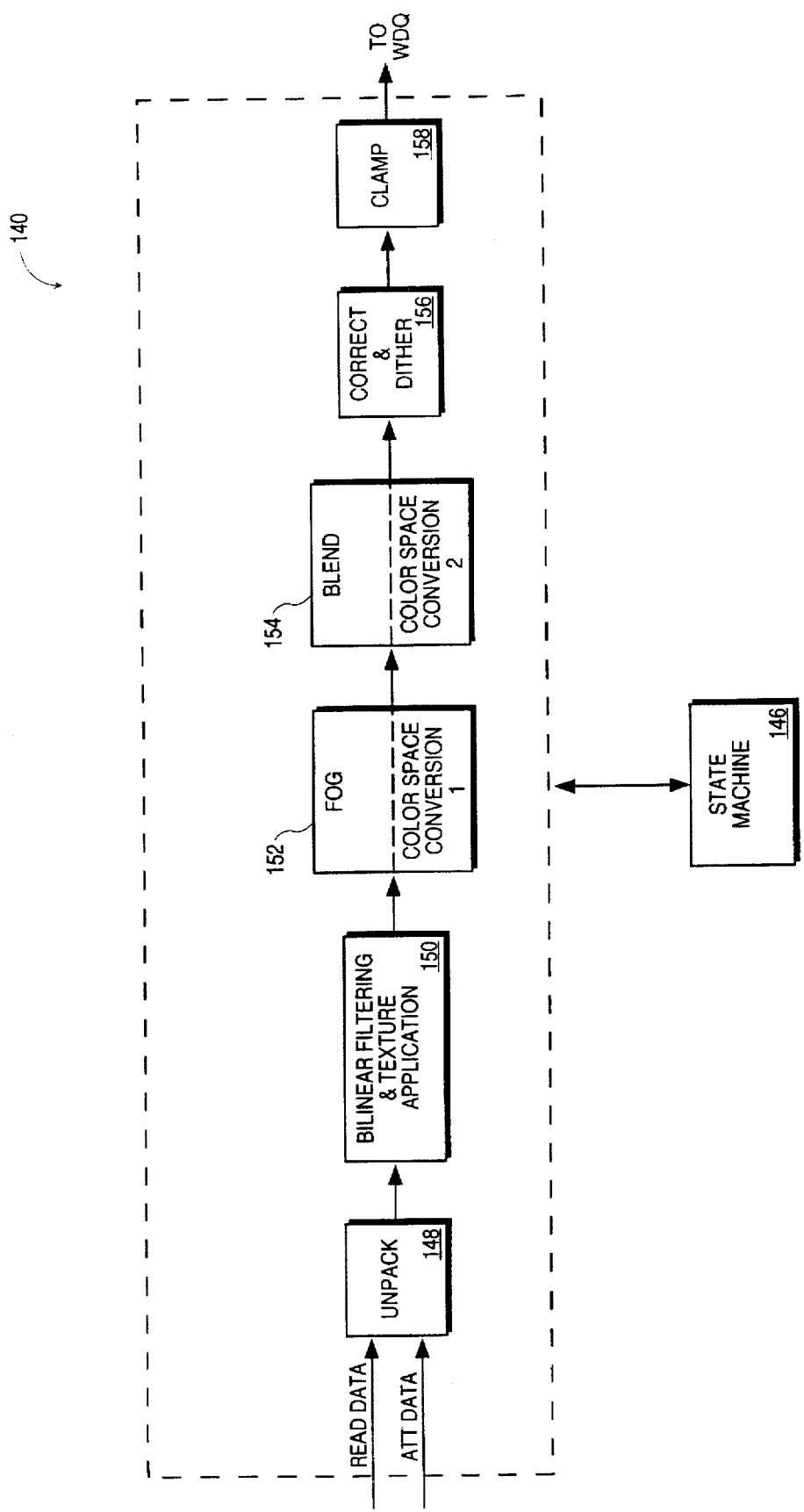
FIG. 4 illustrates a pixel pipeline according to the present invention.

The present invention is implemented in circuitry within stage 2 circuitry 140. FIG. 4 illustrates stage 2 circuitry 140 in greater detail. Stage 2 circuitry 140 implements a pixel pipeline in which the following functions are performed: pixel unpacking, bilinear filtering and texture application, fog, blending, color space conversion, pixel correction and dithering, and clamping. These functions are coordinated and timed by a state machine 146. According to the present invention, color space conversion is performed using both fog circuitry and blend circuitry, rather than providing separate, dedicated color space conversion circuitry. More specifically, an initial stage of color space conversion is performed (when requested) by fog circuitry 152, and a final stage of color space conversion is performed using blend circuitry 154. Circuit 152 can provide either fog effect or a first stage of color space conversion at a given point and time, but not both. Similarly, blend/color space conversion circuit 154, which receives input from circuit 152, can provide either blending or a second stage of color space conversion at a given point in time.

In stage 2 circuitry 140, an unpack circuit 148 receives pixel color values from RAM 110 or data cache 106 via signal READ DATA and receives pixel attribute values via signal ATT DATA. Unpack circuit 148 converts color data into segments of 8 bits. For example, color data might be provided to the unpack circuit 148 in 16-bit words, each word consisting of, for example, three five-bit color segments and 1 unused bit. Accordingly, unpack circuit 148 would convert ("unpack") each five-bit color segment within each 16-bit word into a separate 8-bit color value. "Unpacked" color values are then provided by unpack circuit 148 to bilinear filtering and texture application circuitry 150.

Circuitry 150 performs functions which may be required to provide zooming and application of textured surfaces to an image. Circuitry 150 outputs pixel color values to fog/color space conversion circuitry 152. Fog/color space conversion circuitry 152 outputs color values to blend/color space conversion circuitry 154. Circuit 156 receives as input the output of circuit 154 and provides dithering as well as a correction function.

The correction function is required to compensate for a potential loss of pixel intensity that would otherwise be inherent in the present system. Specifically, the pixel engine 140 uses 8-bit color values to represent an intensity scale of 0 to 256. However, the maximum binary value that can be represented with 8 bits is 255, which is only 99.6% of the maximum allowable intensity value of 256. Since this ratio is less than 1 (i.e., 0.996), a loss of pixel intensity would result each time a color value is redrawn unless appropriate correction is provided. Consequently, circuit 156 rescales each processed color value to avoid such loss in intensity. The details of this rescaling procedure are described below with reference to FIG. 6.

Clamping circuit 158 receives as input the output of circuit 156 and provides both high end and low end limiting of pixel color values. Pixel color values are then output by clamp circuit 158 to the write data queue 142.

Figure 5A:
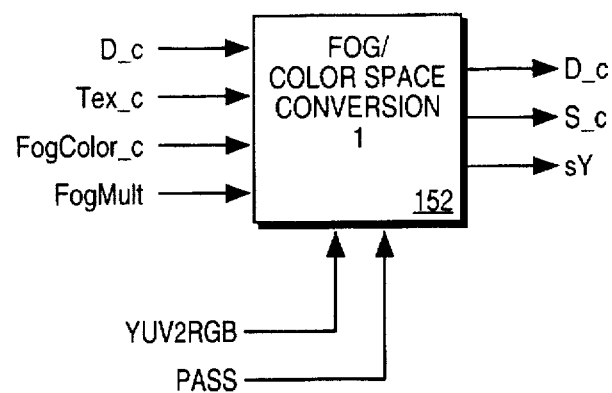
FIG. 5A illustrates a fog/color space conversion circuit in block diagram form.

FIG. 5A illustrates the inputs and outputs of fog/color space circuit 152. Circuit 152 receives as input, for each of the red, green, and blue color components, a destination color value, D_c, a source color value, Tex_c, and a fog color value, FogColor_c. (Note that in this description, the suffix "_c" in the name of a signal is generic and may be replaced in the actual circuit by a more specific suffix to indicate that signal for a particular color component or channel, e.g., "_r" for the red channel.) In addition, circuit 152 receives as input a fog factor, FogMult. Further, circuit 152 receives from state machine 146 control signals YUV2RGB and PASS. Circuit 152 outputs the destination color value D_c and a modified source color value S_c for reach of the red, green, and blue color components. In addition, circuit 152 outputs an intermediate color signal sY, which is used during color space conversion, as will be described below.

Circuit 152 can be placed in either fog mode or color space conversion mode according to the state of control signal YUV2RGB. Specifically, circuit 152 performs color space conversion when signal YUV2RGB is asserted. In the preferred embodiment, signal YUV2RGB is an active-high signal.

In the preferred embodiment, the color space conversion function converts color values in $YC_rC_b$ (luminance, red chrominance, blue chrominance) color space, sometimes referred to as YUV color space, to color values in RGB (red, green, blue) color space. It should be appreciated, however, that color space conversion may be performed between various different color spaces other than $YC_rC_b$ or RGB within the scope of the present invention.

Control signal PASS will be asserted when neither color space conversion nor fog effect is requested. The effect of asserting the PASS signal is to cause the source color value Tex_c to be passed through circuit 152 to output S_c unmodified.

In fog mode (i.e., when signal YUV2RGB is not asserted), circuit 152 generally modifies the input source color value Tex_c based on the following well-known fog equation:

$$S\_c = FogMult*(Tex\_c - FogColor\_c) + FogColor \quad (1)$$

More specifically, however, circuit 152 actually implements equation (2) in order to provide proper rounding of color values.

$$S\_c = [FogMult*(Tex\_c - FogColor\_c) + ((FogColor_c << 8) + 128)] >> 8 \quad (2)$$

The symbols "<<" and ">>" represent the functions "shift left" and "shift right", respectively, where the number immediately following the symbol indicates the number of bits by which the number immediately preceding the symbol is to be shifted.

As noted above, the present system uses a pixel intensity scale of 0 to 256. Hence, adding the value 128 in equation (2) has the effect of adding one half (i.e., 128/256=0.5) to the partial sum which precedes it.

In equation (2), and in the circuitry which implements equation (2), adding the value 128 to the partial sum and then right-shifting the resulting sum by eight bits ensures proper rounding of pixel color values.

In color space conversion mode (i.e., when signal YUV2RGB is asserted), circuit 152 generates intermediate term sY based, in concept, on equation (3), where Y represents the input luminance value.

$$sY = 1.16*(Y - 0.063) + 0.5 \quad (3)$$

However, because the present system uses a color value intensity scale of 0 to 256, circuit 152 actually generates signal sY according to equation (4), where the values 297, 16, and 128 are based on a scale of 0 to 256.

$$sY = 297*(Y - 16) + 128 \quad (4)$$

The luminance value Y is applied to the Tex_c input of the green component circuit of circuit 152 (i.e., to the Tex_g input) during color space conversion, as will be described below.

Figure 5B:
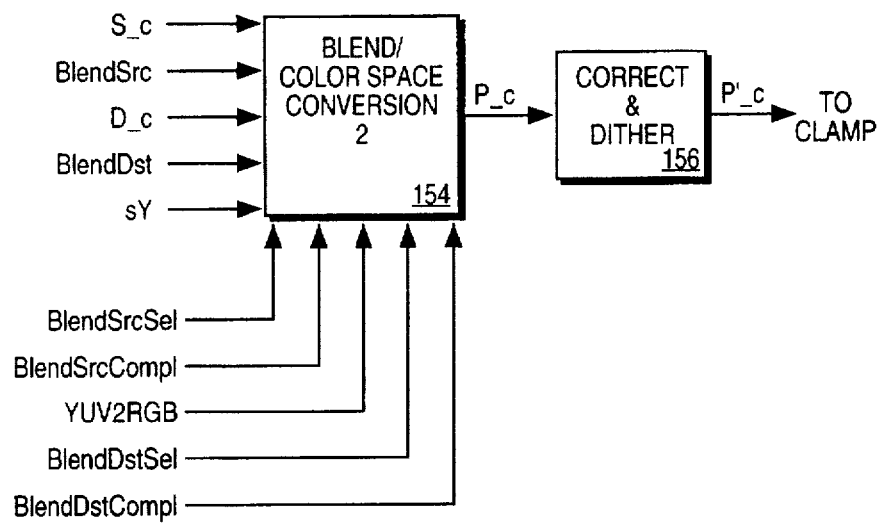
FIG. 5B illustrates blend/color space conversion circuitry, correction/dither circuitry, and clamp circuitry in block diagram form.

FIG. 5B illustrates the inputs and outputs of blend/color space conversion circuit 154. Circuit 154 performs either blending or a second stage of the color space conversion, depending on the state of control signal YUV2RGB. Specifically, color space conversion is performed when signal YUV2RGB is asserted. Circuit 154 receives as inputs, for each of the red, green, and blue color components, signals S_c and D_c. Destination color values D_c are received from frame buffer 112. In addition, circuit 154 receives signals BlendSrc and BlendDst, and sY. In blend mode, circuit 154 generates an output color value P_c according to equation (5).

$$P\_c = S\_c*BlendSrc + D\_c*BlendDst \quad (5)$$

Blend equation (5) is well known in the art of computer graphics. In equation (5), as is well known, the value BlendSrc can have the following possible values: D_c, 1−D_c, S_alpha, 1−S_alpha, D_alpha, 1−D_alpha, 0, 1, source_alpha_saturate, or 1−source-alpha-saturate. In the aforementioned signals, "alpha" refers to the transparency channel (attribute). The alpha channel and the nature of its associated signals named above are well-known in the art of designing graphics processing circuitry. The details of the alpha channel and methods of generating these signals are not necessary to understanding of the present invention and are therefore not discussed herein.

Similarly, BlendDst can have the following possible value: S_c, 1−S_c, S_alpha, 1−S_alpha, D_alpha, 1−D_alpha, 0, or 1. In addition to control signal YUV2RGB, circuit 154 receives the following 3-bit control signals: BlendSrcSel, BlendSrcCompl, BlendDstSel, and BlendDstCompl. These control signals are used to select values for BlendSrc and BlendDst.

The output of circuit 154, pixel color value P_c, is provided to correction and dither circuit 156, which performs correction as described above and which provides dithering in accordance with a dither matrix value. Procedures for performing dithering are well known in the art and accordingly need not be described herein.

Correction and dither circuit 156 provides an output color value P'_c to clamping circuit 158 for each of the red, green, and blue color components.

During color space conversion (i.e., when signal YUV2RGB is asserted), circuits 152 and 154, in combination, generate red (R), green (G), and blue (B) color values based, in concept, on equations (6), (7), and (8), using sY as defined by equation (3), where $C_r$ and $C_b$ represent red and blue chrominance values, respectively.

$$R = sY + 1.590*(C_r - 0.5) \quad (6)$$

$$G = sY - 0.806*(C_r - 0.5) - 0.391*(C_b - 0.5) \quad (7)$$

$$B = sY + 2.011*(C_b - 0.5) \quad (8)$$

However, because the present system uses an intensity scale of 0 to 256, circuit 154 actually generates red, green, and blue pixel color values P_r, P_g, and P_b, respectively, according to equations (9), (10), and (11), where sY is defined by equation (4).

$$P\_r=\text{floor}((sY+407*(C_r-128))/255) \quad (9)$$

$$P\_g=\text{floor}((sY-207*(C_r-128)-100*(C_b-128))/255) \quad (10)$$

$$P\_b=\text{floor}((sY+515*(C_b-128))/255) \quad (11)$$

During color space conversion, the fog color inputs FogColor_c to circuit 152 must be set to the following values (based on a scale of 0 to 256) for the red, green, and blue components, respectively: FogColor_r=128; FogColor_g=16; and FogColor_b=128.

Figure 7:
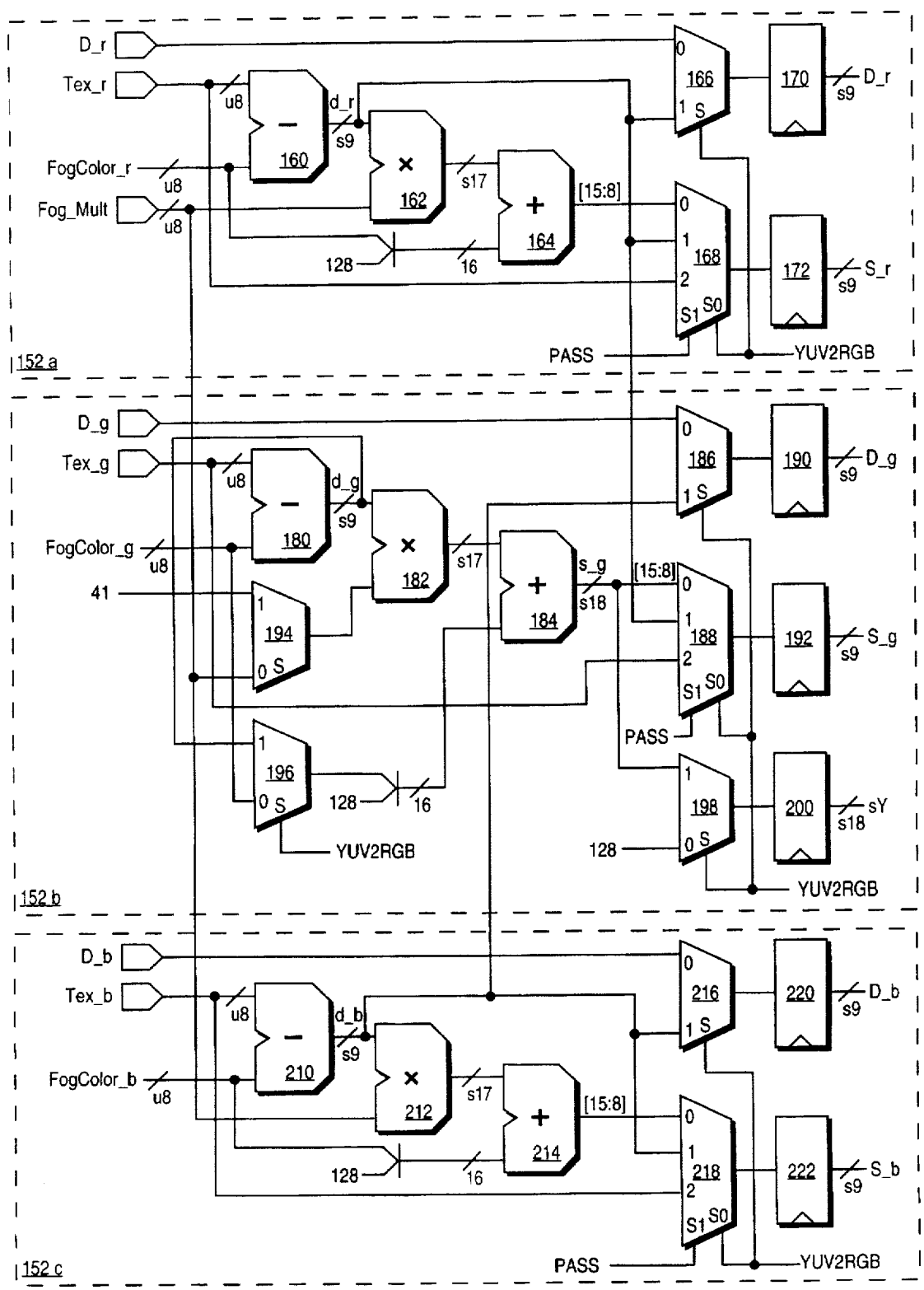
FIG. 7 is a circuit diagram of fog/color space conversion circuitry.

Referring now to FIG. 7, fog/color space circuit 152 is illustrated in greater detail. It should be appreciated that fog equations (1) and (2) are, in general, linear interpolation functions having the general format, output=F*(B−A)+A+ ½. It should also be appreciated that the color space conversion equations (9) through (11) can also be expressed in this same general format. The present invention therefore takes advantage of this fact in order to use the fog circuitry and blend circuitry to perform color space conversion.

As shown in FIG. 7, circuitry 152 contains separate component circuits 152a, 152b, and 152c, for each of the red, green, and blue color components, respectively. The red color component circuitry 152a includes a subtractor 160, a multiplier 162, an adder 164, multiplexors 166 and 168, and registers 170 and 172. To implement either the fog or color conversion functions described above, these elements are coupled as follows: Subtractor 160 receives the red source color value Tex_r as a first input and the red fog color value FogColor_r as a second input and outputs a difference of those two signals, d_r. Tex_r and FogColor_r are each unsigned 8-bit numbers, while output D_r is a signed 9-bit number. Multiplier 162 receives as a first input the signal d_r and receives as a second input the fog factor FogMult, which is an 8-bit unsigned number. The multiplier 162 outputs the product of its two inputs as a signed 17-bit number to a first input of adder 164. The second input of adder 164 receives a 16-bit number, the eight least significant bits (LSBs) of which are set to the value 128, and the eight most significant bits (MSBs) of which are provided by the signal FogColor_r. Adder 164 generates an 18-bit sum (bits 0 through 17), bits 8 through 15 of which are output to input 0 of multiplexor 168.

Multiplexor 168 is a three-input multiplexor. Input 1 of multiplexor 168 receives signal D_r, while input 2 of input multiplexor 168 receives Tex_r. The inputs of multiplexor 168 are selected according to the combination of signals PASS and YUV2RGB, which are applied to control inputs s1 and s0, respectively, of multiplexor 168. In particular, if PASS is set to 1, then input 2 of multiplexor 168 is passed through to its output to register 172. Otherwise, if YUV2RGB is 0, then input 0 is selected, and if YUV2RGB is 1, input 1 is selected.

Multiplexor 166 is a two input multiplexor. Input 0 which receives the red destination color value D_r, while input 1 receives signal d_R. The inputs are selected according to the state of signal YUV2RGB, as described above, which is applied to the control input s of multiplexor 166. The output of multiplexor 166 is supplied to register 170. The output of register 170 is the signal D_r, and the output of register 172 is signal S_r, each of which is a signed 9-bit number.

When signal YUV2RGB is asserted (i.e., when color space conversion is requested), then the Tex_r input receives the $C_r$ value, and the FogColor_r input is set to 128. During color space conversion, the signal FogMult is used only by the green component circuit, as described below.

It should be appreciated that by using the circuit configuration illustrated in FIG. 7 and described above, the output S_r of circuit 152 will have the value $C_r$−128 during color space conversion (note that input 1 of multiplexor 168 will be selected).

Fog/color space conversion circuit 152 also includes green component circuitry 152b comprising subtractor 180, multiplier 182, adder 184, multiplexors 186, 188, 194, 196, 198, and registers 190, 192, and 200. Registers 190 and 192 output signals D_g and S_g, each as a signed 9-bit number. Register 200 outputs intermediate color signal sY as a signed 18-bit number during color space conversion. Subtractor 180 receives input signals Tex_g and FogColor_g, each as an unsigned 8-bit number and generates a difference signal d_g as a signed 9-bit number. Signal d_g is applied to one input of multiplier 182, while a second input of multiplier 182 is received as the output of multiplier 194. Multiplier 182 generates a signed 17-bit output which is applied to one input of adder 184. A second input of adder 184 receives a 16-bit number, the eight LSBs of which are set to 128, while the eight MSBs of which are provided as the output of multiplex 196. The output of adder 184 is an 18-bit sum signal which is applied to the zero input of multiplexor 188.

Multiplexor 188 is a three-input multiplexor which is controlled using signal PASS and YUV2RGB in the manner described above with respect to the red component circuitry. Similarly, multiplexor 186 is a two-input multiplexor controlled by signal YUV2RGB, as described above. Input 0 of multiplexor 186 receives signal D_g, while input 1 of multiplexor 186 receives the output of subtractor 210 of the blue component circuit, as will be described below. Input 1 of multiplexor 188 receives signal d_r from the red component circuit 152a, while the two input receives signal Tex_g. Multiplexors 194 and 196 are each two-input multiplexors controlled by signal YUV2RGB. A value of 41 is applied to input 1 of multiplexor 194, while the signal FogMult is applied to input 0 of multiplexor 194. Input 1 of multiplexor 196 receives the output d_g of subtractor 180, while input 0 of multiplexor 196 receives the signal FogColor_g. Multiplexor 198 is a two-input multiplexor controlled by signal YUV2RGB. Input 1 of multiplexor 198 receives the output of adder 184, while input 0 of multiplexor 198 receives the value of 128.

During color space conversion (when signal YUV2RGB is set to 1), the Tex_g input receives the luminance value Y, while the FogColor_g input receives the value 16. The Fog factor FogMult is set to a value of 41. It should be appreciated that the intermediate signal sY is used only during color space conversion. It should further be appreciated that during color space conversion, the output S_g of register 192 has the value $C_r$−128, while the signal D_g has the value $C_b$−128. Note that, during color space conversion, the second input of adder 184 receives a signal having the value 256*(Y − 16), which is the combination of the output of multiplexor 196 and the value 128. More specifically, the value Y − 16 is provided through input 1 of multiplexor 196, which value is then multiplied by 256 by shifting the value eight bits to the left. The eight LSBs bits of the resulting 16-bit number are then set to 128 to provide proper rounding.

Circuit 152 also contains blue component circuitry 152c including subtractor 210, multiplier 212, adder 214, multiplexors 216 and 218, and registers 220 and 222. Register 220 outputs signal d_b as a signed 9-bit number, while register 222 outputs signal S_b as an unsigned 9-bit number. Subtractor 210 receives signal Tex_b as an unsigned 8-bit number at a first input and signal FogColor_b as an unsigned 8 bit number at second input and outputs the difference of those two signals as signal d__b, a signed 9-bit number. Signal d__b is provided to one input of multiplier 212, while the other input of multiplier 212 receives the fog factor signal, FogMult. Multiplier 212 outputs the product of its two inputs as a signed 17-bit number, which is applied to one input of adder 214. The other input of adder 214 receives a 16-bit number, the eight LSBs of which are set to 128, and the eight MSBs of which are formed by the signal FogColor__b. Adder 214 outputs a signed 18-bit number to input 0 of multiplexor 218.

Multiplexor 218 is a three-input multiplexor controlled by the combination of signals PASS and YUV2RGB in the manner described above. Input 1 of multiplexor 218 receives the output d__b of subtractor 210. Input 2 of multiplexor 218 receives signal Tex__b. Multiplexor 218 provides its output to the input of register 222. Multiplexor 216 is a two-input multiplexor controlled by signal YUV2RGB applied to its control input s. Input 0 of multiplexor 216 receives signal D__b, while input 1 of multiplexor 216 receives difference signal d__b.

During color space conversion, input Tex__b receives the $C_b$ value, while the FogColor__b input receives the value 128. Accordingly, it will be appreciated that during color space conversion, output S__b is equal to outputs D__b and D__g, which have the value $C_b-128$. Accordingly, during color space conversion, signals D__r, S__r, D__g, S__g, sY, D__b, and S__b are provided to blend/color space conversion circuit 154 for the second (final) stage of color space conversion.

Figure 8A:
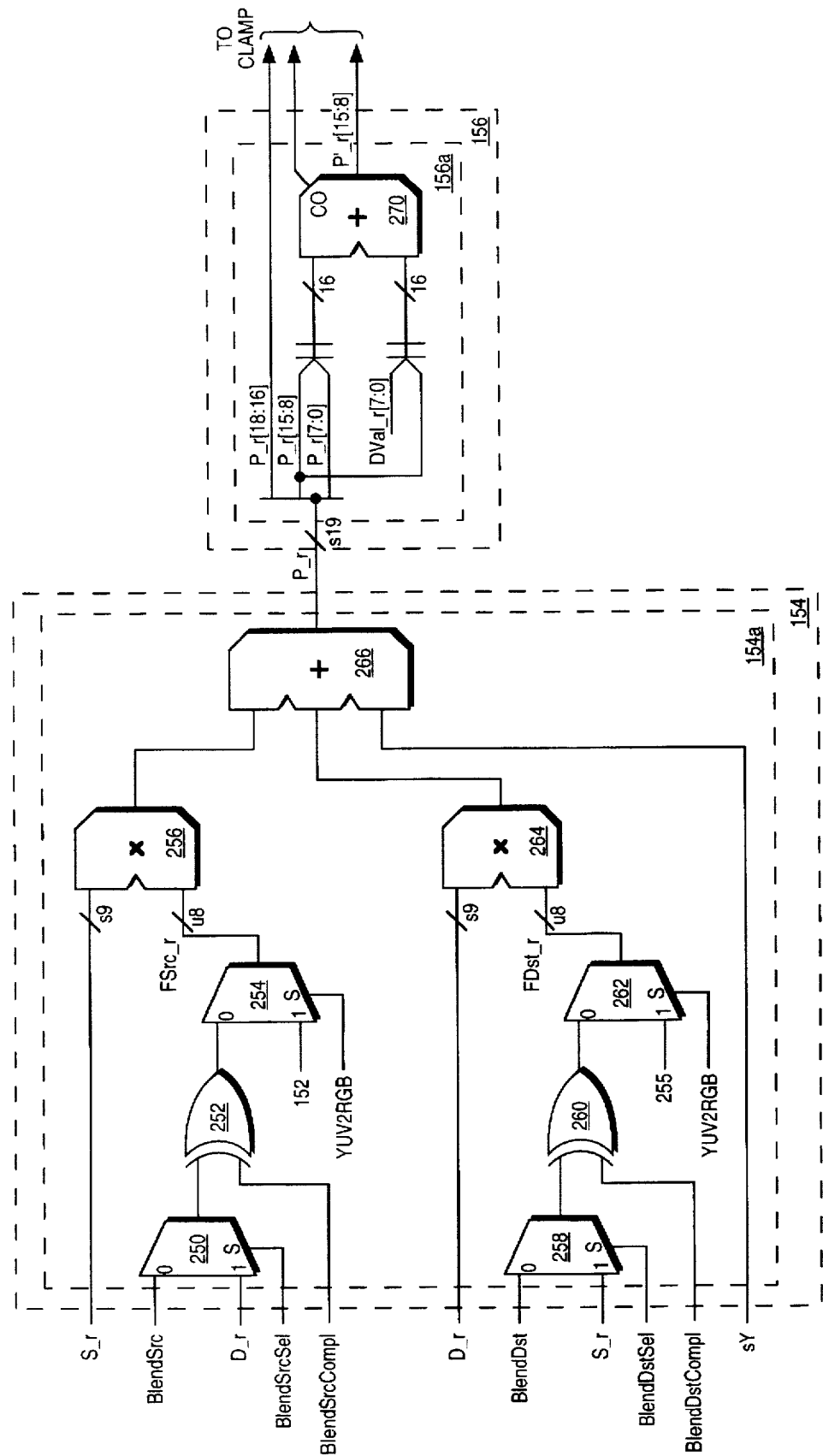
FIG. 8A is a circuit diagram of blend/color space conversion red component circuitry.
Figure 8B:
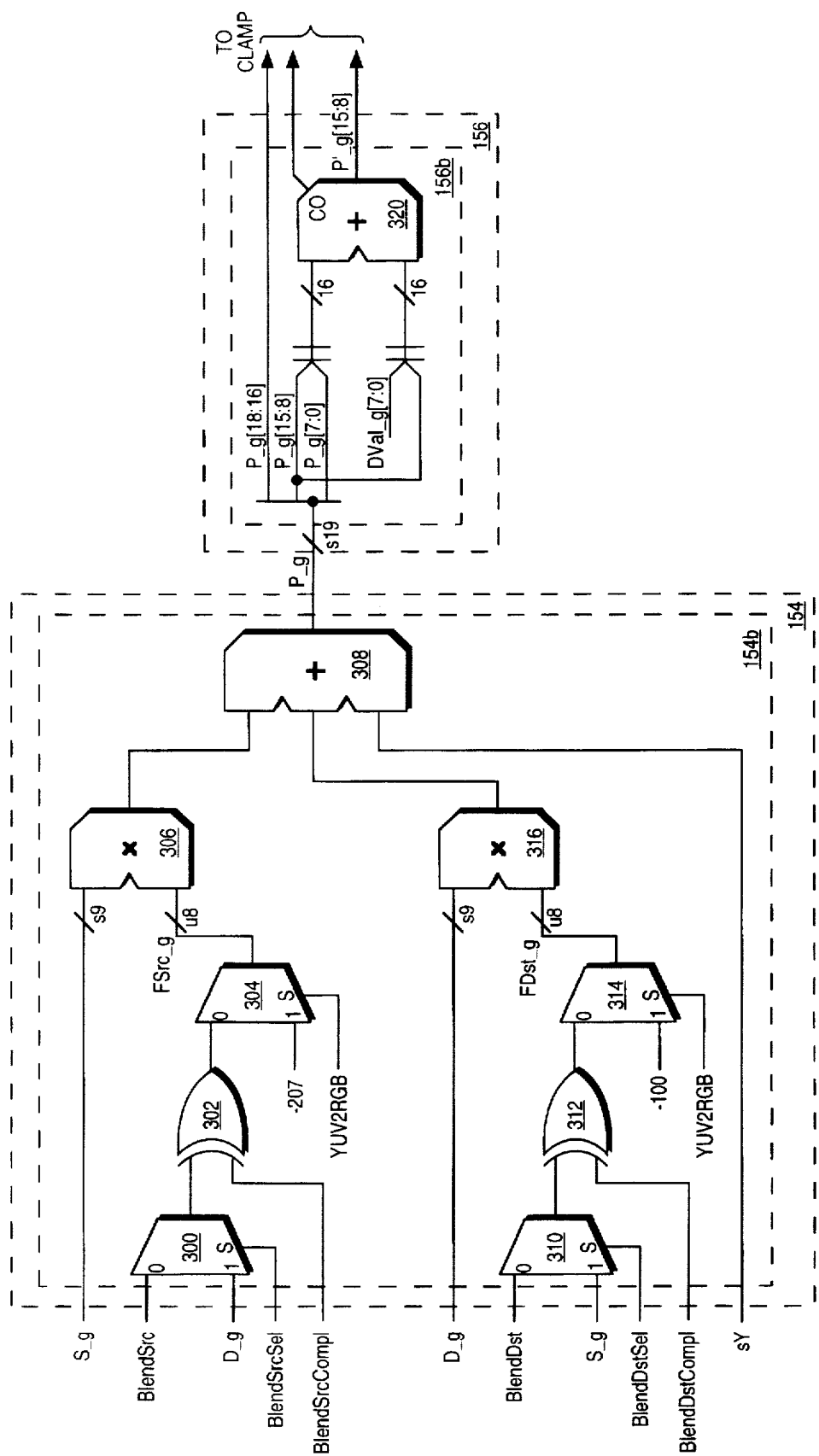
FIG. 8B is a circuit diagram of blend/color space conversion green component circuitry.
Figure 8C:
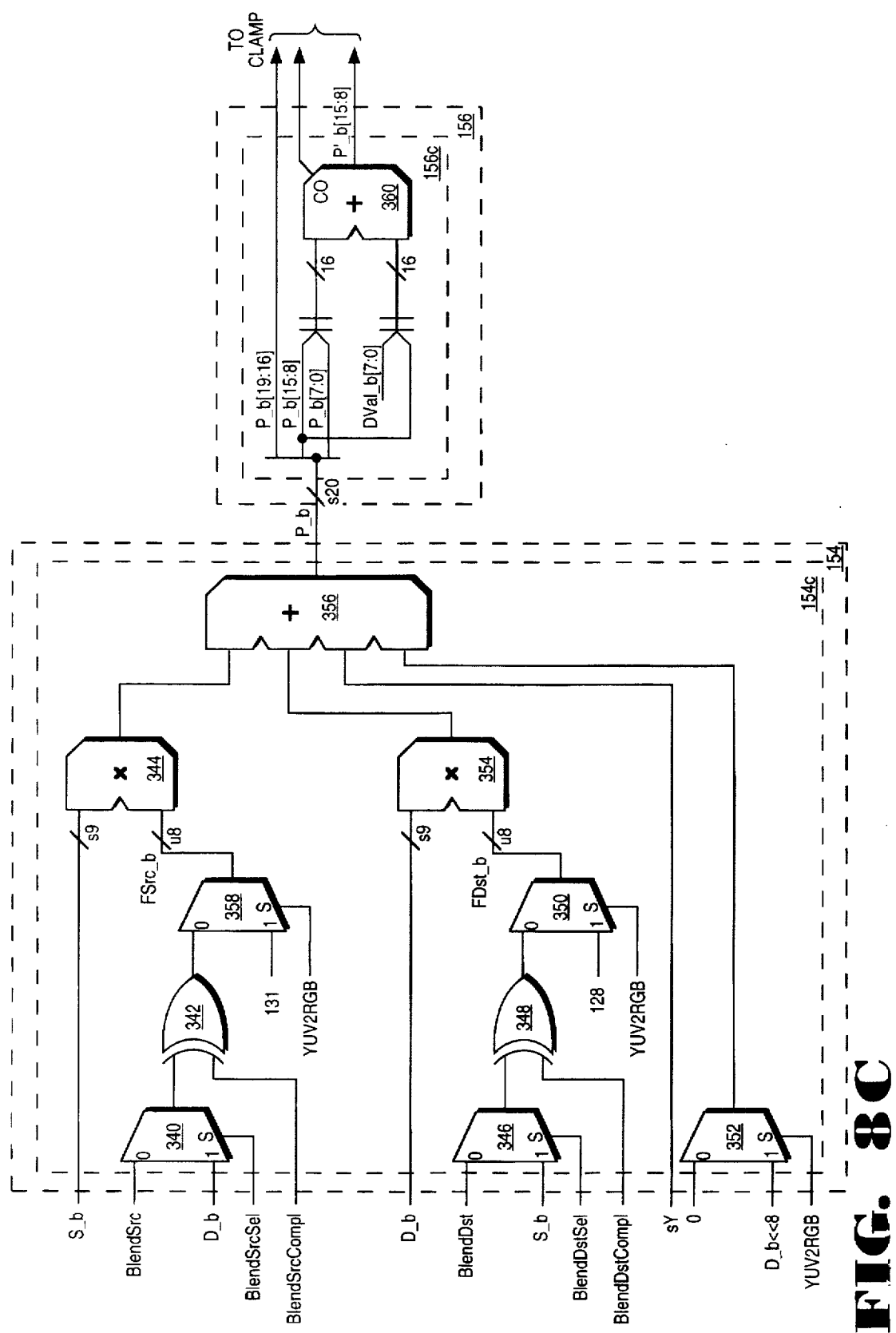
FIG. 8C is a circuit diagram of blend/color space conversion blue component circuitry.

FIGS. 8A, 8B, and 8C illustrate blend/color space conversion circuit 154 and correction/dither circuit 156 in greater detail. In particular, circuits 154 and 156 includes red component circuitry 154a and 156a, respectively (FIG. 8A); green component circuitry 154b and 156b, respectively (FIG. 8B); and blue component circuitry 154c and 156c, respectively (FIG. 8C).

Referring now to FIG. 8A, the red component circuitry 154a of circuit 154 includes multiplexors 250, 252, 258, and 262, exclusive OR (XOR) gates 252 and 260, multipliers 256 and 264, and adder 266. Multiplier 256 receives signal S__r from circuit 152 as a signed 9-bit number at one input and the output of multiplexor 254 as an unsigned 8-bit number at a second input. Multiplexor 254 is a two-input multiplexor controlled by signal YUV2RGB applied to its control input s. Input 0 of multiplexor 254 receives the output of XOR gate 252, while input 1 of multiplexor 254 (used during color space conversion) receives the value 152. XOR gate 252 has two inputs, one of which receives the output of multiplexor 250 while the other receives the LSB (bit 0) of signal BlendSrcCompl.

Multiplexor 250 is a two-input multiplexor controlled by signal BlendSrcSel applied to its control input s. Input 0 of multiplexor 250 receives signal BlendSrc while input 1 receives signal D__r from circuit 152. The output of multiplier 256 is applied to input 1 of three-input adder 266. A second input of adder 266 receives intermediate signal sY from circuit 152 as a signed 18-bit number. Note that during blending, (i.e., when signal YUV2RGB is not asserted), signal sY is set to 128 to facilitate proper rounding. The third input of adder 266 receives the output of multiplier 264. Multiplier 264 receives as input the signed 9-bit signal D__r from circuit 152 and the unsigned 8-bit output of multiplexor 262.

Multiplexor 262 is a two-input multiplexor controlled by signal YUV2RGB. Input 0 of multiplexor 262 receives the output of XOR gate 260, while input 1 receives the value 255. XOR gate 260 receives the output of multiplexor 258 at a first input and the LSB (bit 0) of signal BlendSrcCompl at second input. Multiplexor 258 is a two-input multiplexor controlled by signal BlendDstSel. Input 0 of multiplexor 258 receives signal BlendDst, while input 1 of multiplexor 258 receives signal S__r from circuit 152. Adder 266 outputs a signed 19-bit signal P__r. It will be appreciated that during color space conversion, signal P__r is generated according to the equation (9).

Signal BlendSrc may have any of the following possible values: source-alpha-saturate, S__alpha, D__alpha, and 00; the value at any given time is determined by the value of three-bit control signal BlendSrcCompl. In particular, the two MSBs (bits 1 and 2) of signal BlendSrcCompl are used to select the value of BlendSrc. This function may be accomplished by applying the possible values of BlendSrc as inputs to a multiplexor (not shown) and using signal BlendSrcCompl as the control input of the multiplexor. Similarly, signal BlendDst may have any of the values, D__alpha, 00, S__alpha, as determined by the value of the two MSBs of signal BlendDstCompl.

XOR gates 252 and 260 provide a selectable inversion function. That is, signals BlendSrcCompl and BlendDst-Compl are applied as control signals to one input of XOR gates 252 and 260, respectively. When asserted, the control signal causes the other input of the XOR gate to be inverted. When the control signal is not asserted, the other input of the XOR gate is effectively passed through to the output. Hence, this inversion function can be used during blending to derive additional values from the signals BlendSrc and BlendDst, namely the values (1–BlendSrc) and (1–BlendDst).

Referring now to FIG. 8B, circuit 154 also includes green color component circuitry 154b. The green component circuitry 154b of circuit 154 includes multiplexors 300, 304, 310, and 314, XOR gates 302 and 312, multipliers 306 and 316, and adder 308. Circuit 154b has a structure that is essentially identical to that of circuit 154a. In particular, multiplier 306 receives signal S__g from circuit 152 as a signed 9-bit number at one input and the output of multiplexor 304 as an unsigned 8-bit number at a second input. Multiplexor 304 is a two-input multiplexor controlled by signal YUV2RGB applied to its control input s. Input 0 of multiplexor 304 receives the output of XOR gate 302, while input 1 of multiplexor 304 (used during color space conversion) receives the value –207. XOR gate 302 has two inputs, one of which receives the output of multiplexor 300 while the other receives the LSB (bit 0) of signal Blend-SrcCompl. XOR gates 302 and 312 provide a selectable inversion function, as described above with reference to XOR gates 252 and 260.

Multiplexor 300 is a two-input multiplexor controlled by signal BlendSrcSel applied to its control input s. Input 0 of multiplexor 300 receives signal BlendSrc while input 1 receives signal D__g from circuit 152. The output of multiplier 306 is applied to input 1 of three-input adder 308. A second input of adder 308 receives intermediate signal sY from circuit 152 as a signed 18-bit number. As mentioned above, signal sY is set to 128 during blending to provide proper rounding. The third input of adder 308 receives the output of multiplier 316. Multiplier 316 receives as input the signed 9-bit signal D__g from circuit 152 and the unsigned 8-bit output of multiplexor 314.

Multiplexor 314 is a two-input multiplexor controlled by signal YUV2RGB. Input 0 of multiplexor 314 receives the output of XOR gate 312, while input 1 receives the value –100. XOR gate 312 receives the output of multiplexor 310 at a first input and the LSB (bit 0) of signal BlendDstCompl at a second input. Multiplexor 310 is a two-input multiplexor controlled by signal BlendDstSel. Input 0 of multiplexor 310 receives signal BlendDst, while input 1 of multiplexor 310 receives signal S_r from circuit 152. Adder 308 outputs a signed 19-bit signal P_g. It will be appreciated that during a color space conversion, signal P_g is generated according to the equation (10).

Referring now to FIG. 8C, circuit 154 also includes blue color component circuitry 154c. The blue component circuitry 154c of circuit 154 includes multiplexors 340, 358, 346, 350, and 352, XOR gates 342 and 348, multipliers 344 and 354, and adder 356. Circuit 154c has a structure that is similar to that of circuits 154a and 154b. In particular, multiplier 344 receives signal S_b from circuit 152 as a signed 9-bit number at one input and the output of multiplexor 358 as an unsigned 8-bit number at a second input. Multiplexor 358 is a two-input multiplexor controlled by signal YUV2RGB applied to its control input s. Input 0 of multiplexor 358 receives the output of XOR gate 342, while input 1 of multiplexor 358 (used during color space conversion) receives the value 131. XOR gate 342 has two inputs, one of which receives the output of multiplexor 340 while the other receives the LSB (bit 0) of signal BlendSrcCompl. XOR gates 342 and 348 provide a selectable inversion function, as described above with reference to XOR gates 252 and 260.

Multiplexor 340 is a two-input multiplexor controlled by signal BlendSrcSel applied to its control input s. Input 0 of multiplexor 340 receives signal BlendSrc while input 1 receives signal D_b from circuit 152. The output of multiplier 344 is applied to a first input of four-input adder 356. A second input of adder 356 receives intermediate signal sY as a signed 18-bit number from circuit 152. Again, signal sY is set to 128 during blending. A third input of adder 356 receives the output of multiplier 354. Multiplier 354 receives as input the signed 9-bit signal D_b from circuit 152 and the unsigned 8-bit output of multiplexor 350. The fourth input of adder 356 receives the output of multiplexor 352. Multiplexor 352 has two inputs and is controlled by signal YUV2RGB applied to its control input s. A first input of multiplexor 352, which is selected when signal YUV2RGB is not asserted, receives the value 0. The second input of multiplexor 352 receives the value D_b<<8 (D_b left-shifted by eight bits).

Multiplexor 350 is a two-input multiplexor controlled by signal YUV2RGB. Input 0 of multiplexor 350 receives the output of XOR gate 348, while input 1 receives the value 128. XOR gate 348 receives the output of multiplexor 346 at a first input and the LSB (bit 0) of signal BlendDstCompl at a second input. Multiplexor 346 is a two-input multiplexor controlled by signal BlendDstSel. Input 0 of multiplexor 346 receives signal BlendDst, while input 1 of multiplexor 346 receives signal S_r from circuit 152. Adder 356 outputs a signed 19-bit signal P_g. It should be appreciated that during color space conversion, signal P_g is generated according to the equation (11).

In circuit 154c (FIG. 8C), the values 131, 128, and D_b <<8 applied to multiplexors 358, 350, and 352, respectively, represent in combination the factor 515 in equation (11). That is, (131+128)*D_b+(D_b<<8)=(131+128+256)*D_b=515*D_b, which equals 515*(Cr−128) during color space conversion.

Hence, it should be appreciated that during color space conversion mode (i.e., when signal YUV2RGB is asserted), circuit 152 in combination with circuits 154a, 154b, and 154c implement equations (9) through (11).

Color signals P_r, P_g, and P_b are applied to correction and dither circuit 156, and more precisely, to subcircuits 156a, 156b, and 156c, respectively. Correction and dither circuit 156 simultaneously performs dithering and scaling of the value of signal P_c in the manner described above. Correction and dither circuit 156 includes a single full adder 270. Adder 270 has two inputs, each of which receives a 16-bit number. The principle of operation of dither and correction circuit 156 will now be described with reference to FIGS. 6A, 6B, and 6C.

Figure 6A:
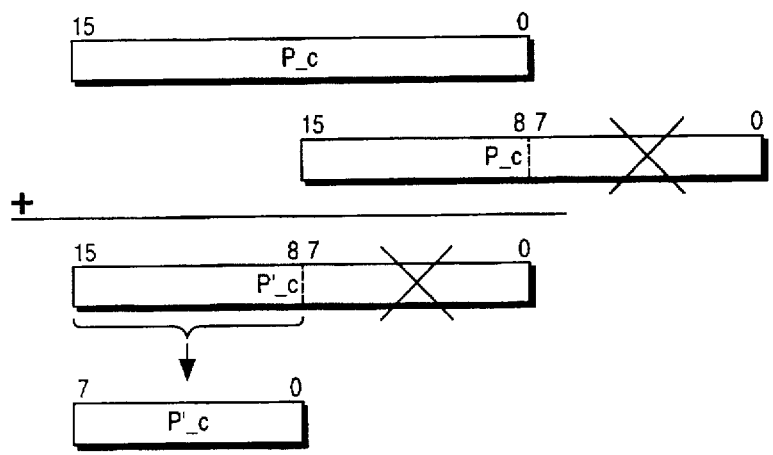
FIGS. 6A illustrates a procedure for performing correction according to the present invention.

FIG. 6A illustrates a correction function for scaling color values to a scale of 0 to 256. Assume that an input pixel color value is initially received by a correction circuit as a 16-bit value P_c including a fractional component. The color value P_c is added to a second value, which consists of the value P_c shifted right by eight bits. Hence, in the second value, the lowest eight bits are discarded. The resulting sum is a 16-bit number, the lowest eight bits of which are also discarded. The remaining eight bits represent a "corrected" pixel value P'_c, which is correctly scaled such that the maximum possible value corresponds to the maximum possible intensity.

Figure 6B:
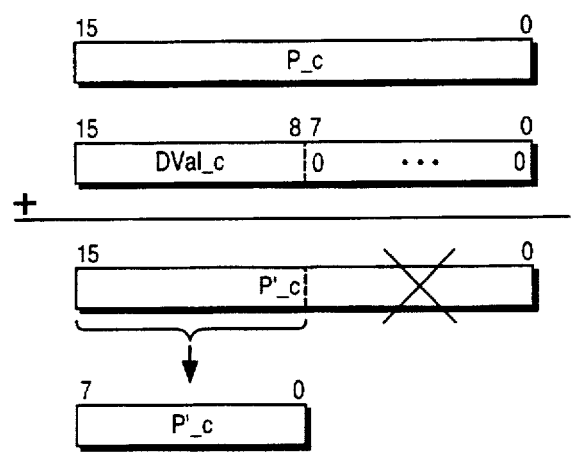
FIGS. 6B illustrates a procedure for performing dithering according to the present invention.

FIG. 6B illustrates an example of a dithering function. An 8-bit dither value DVal_c is used to operate upon the pixel color value P_c. The dither value DVal_c is the dither matrix value appropriately shifted based on the number of bits used to represent color values in memory. The steps for generating a dither matrix are well-known in the art of computer graphics and accordingly will not be discussed herein. The 8-bit dither value DVal_c is padded with eight zeros on the right and then added to the 16-bit pixel color value P_c. In the resulting sum, the eight LSBs are discarded and the remaining bits are taken as the dithered color value P'_c.

Figure 6C:
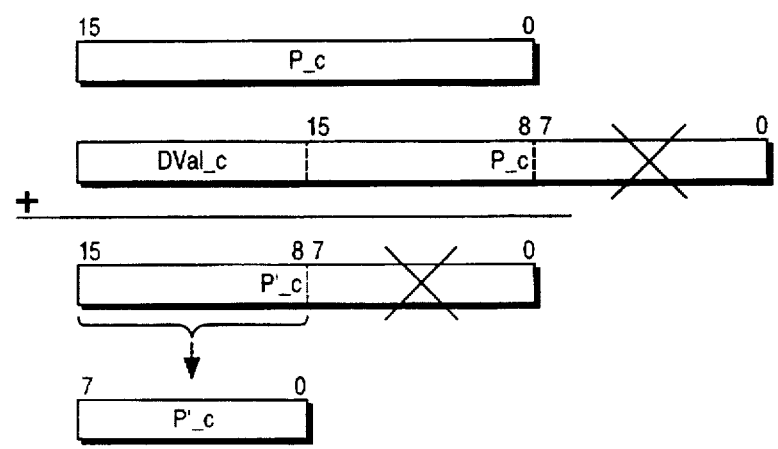
FIGS. 6C illustrates a procedure for simultaneously performing correction and dithering according to the present invention.

In accordance with the present invention, dithering and correction are performed simultaneously by 156a, 156b, and 156c for the red, green, and blue color components, as illustrated in FIG. 6C. Referring now to FIG. 6C and, for example, to FIG. 8A, the 8-bit dither value DVal_r is padded on the right with the eight MSBs of a pixel value P_r to form a 16-bit compound value which is received at one input of adder 270. This 16-bit compound value is then added to the lowest 16 bits of color value P_r (a 19-bit value), which is applied to the second input of adder 270. The eight LSBs of the resulting sum are discarded, such that the remaining eight bits form the corrected and dithered color value P'_r. The color value P'_r is corrected to a scale of 0 to 256. Essentially the same function is performed in circuits 156b and 156c to generate signals P'_g and P'_b, respectively.

Hence, each of correction and dither circuits 156a, 156b, and 156c outputs a corrected pixel color value P'_c and a carry out output CO to clamping circuit 158. In addition, clamping circuit 158 is supplied with the three MSBs of the P_c signals.

Thus, a method and apparatus for performing color space conversion using blend logic have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for processing a plurality of color values, the apparatus comprising:

a memory storing the color values; and a blend circuit coupled to the memory, the blend circuit including circuit components for blending a first color value received from the memory and a second color value, the circuit components inputting a third color value conforming to a first color space and generating in response to the third color value a fourth color value conforming to a second color space.

2. The apparatus of claim 1, wherein the second color space is R,G,B (red, green, blue).

3. The apparatus of claim 2, wherein the first color space is $Y,C_r,C_b$ (luminance, red chromaticity, blue chromaticity).

4. The apparatus of claim 3, further comprising a second circuit coupled to the blend circuit, wherein the second circuit operates upon one of the color values and provides the third color value to the blend circuit.

5. The apparatus of claim 4, wherein the second circuit generates an intermediate color signal (sY) based substantially on the formula sY=1.16*(Y−0.06)+0.5, and wherein the blend circuit receives the sY signal and generates a red color (R) signal, a green color (G) signal, and a blue color (B) signal based substantially on the formulas:

$$R=sY+1.59*(C_r-0.5);$$

$$G=sY-0.81*(C_r-0.5)-0.39*(C_b-0.5);$$

and $$B=sY+2.0*(C_b-0.5).$$

6. An apparatus for operating upon color values corresponding to a plurality of pixels of a display device, the apparatus comprising:

a fog circuit coupled to receive a first source color value, a fog color value, a fog multiplier value, and a control signal and generating an updated source color value in response thereto when the control signal is not asserted, the fog circuit performing a first stage of converting a second source color value from a first color space to a second color space when the control signal has a first value; and a blend circuit coupled to receive the updated source color value, a destination color value, a source scale factor, a destination scale factor, and the control signal, the blend circuit outputting a blended color value in response thereto when the control signal has a second value, the blend circuit performing a second stage of converting the second source color value from the first color space to the second color space when the control signal has the first value.

7. The apparatus of claim 6, wherein the second color space is RGB (red, green, blue).

8. The apparatus of claim 7, wherein the first color space is $YC_rC_b$ (luminance, red chromaticity, blue chromaticity).

9. The apparatus of claim 6, wherein the fog circuit comprises:

a red component circuit;

a green component circuit coupled to the red component circuit; and a blue component circuit coupled to the red component circuit and to the green component circuit.

10. The apparatus of claim 9, wherein the red component circuit comprises:

a subtractor having a first input, a second input, and an output, wherein when the control signal is not asserted, the subtractor receives the first source color value at the first input and the fog color value at the second input and outputs a first difference value, and wherein when the control signal is asserted, the subtractor receives a second source color value at the first input and a first constant value at the second input and outputs a second difference value;

a multiplier coupled to receive either the first difference value or the second difference value at a first input according to whether the control signal is asserted and coupled to receive a fog factor at the second input, the multiplier outputting a product value;

an adder coupled to receive the product value and a second constant value, the adder outputting a sum value; and a multiplexor coupled to receive at a first input the sum value and coupled to receive at a second input the first difference value or the second difference value, the multiplexor outputting the sum value when the control signal is not asserted and outputting the second difference value when the control signal is asserted.

11. A computer system, comprising:

a processor for controlling operation of the computer system;

a first memory coupled to the processor; and a display adapter coupled to the processor and the first memory, the display adapter including:

a second memory storing a plurality of the color values; and a blend circuit coupled to the second memory, the blend circuit including circuit components for blending a first color value and a second color value, the circuit components inputting a third color value derived from a first color space and generating in response to the third color value a fourth color value conforming to a second color space.

12. The computer system of claim 11, wherein the second color space is R,G,B (red, green, blue).

13. The computer system of claim 12, wherein the first color space is $Y,C_r,C_b$ (luminance, red chromaticity, blue chromaticity).

14. The computer system of claim 13, further comprising a second circuit coupled to the blend circuit, wherein the second circuit operates upon one of the color values and provides the third color value to the blend circuit.

15. The computer system of claim 14, wherein the second circuit generates an intermediate color signal (sY) based substantially on the formula sY=297*(Y−16)+128, and wherein the blend circuit receives the sY signal and generates a red color (R) signal, a green color (G) signal, and a blue color (B) signal based substantially on the formulas:

$$R=(sY+407*(C_r-128))/255;$$

$$G=(sY-207*(C_r-128)-100*(C_b-128))/255;$$

and $$B=(sY+515*(C_b-128))/255.$$

16. The computer system of claim 14, wherein the second circuit is a fog circuit for modifying said one of the color values according to a fog factor, and wherein, during a first stage, the fog circuit generates an intermediate color signal (sY) based substantially on the formula sY=297 *(Y−16)+ 128, and wherein during a second stage, the blend circuit receives the sY signal and generates a red color (R) signal, a green color (G) signal, and a blue color (B) signal based substantially on the formulas:

$$R=(sY+407*(C_r-128))/255;$$

$$G=(sY-207*(C_r-128)-100*(C_b-128))/255;$$

and $$B=(sY+515*(C_b-128))/255.$$

17. A method of performing color space conversion, the method comprising the steps of:
- performing a first stage of converting a first color value from a first color space to a second color space by using first circuit components capable of modifying a second color value according to a fog factor; and
- performing a second stage of converting the first color value from the first color space to the second color space to generate a converted color value by using second circuit components capable of blending a third color value and a fourth color value.

18. The method of claim 17, wherein the step of performing the first stage of converting the first color value from a first color space to the second color space comprises the step of generating an intermediate color signal (sY) based substantially on the formula sY=1.16*(Y−0.06)+0.5, and wherein the step of performing the second stage of converting the first color value from the first color space to the second color space comprises steps of generating a red color (R) signal, a green color (G) signal, and a blue color (B) signal based substantially on the formulas:

$$R = sY + 1.59 * (C_r - 0.5);$$

$$G = sY - 0.81 * (C_r - 0.5) - 0.39 * (C_b - 0.5);$$

and $$B = sY + 2.0 * (C_b - 0.5).$$

19. The method of claim 17, wherein:
- performing the first stage of converting includes the steps of:
  - inputting a luminance signal, a first chromaticity signal, and a second chromaticity signal; and
  - generating an intermediate color signal based on the luminance signal;
- and wherein performing the second stage of converting includes the steps of:
  - generating a first output color signal based on the intermediate color signal and the first chromaticity signal;
  - generating a second output color signal based on the intermediate color signal, the first chromaticity signal, and the second chromaticity signal; and
  - generating a third output color signal based on the intermediate color signal and the second chromaticity signal.

20. The method of claim 19, wherein the step of generating the intermediate color signal includes the steps of:
- using a subtractor to subtract a first constant from the luminance signal to generate a difference signal;
- using a multiplier to multiply the difference signal by a second constant to generate a product signal; and
- using an adder to add a third constant to the product signal to generate the intermediate color signal.

21. The method of claim 20, further comprising the step of outputting the first, second, and third output color signals based on the intermediate color signal during the second stage of converting the first color value.

22. The method of claim 21, wherein:
- generating the intermediate color signal comprises generating the intermediate color signal (sY) based on the formula $$sY = 297 * (Y - 16) + 128$$

wherein Y represents the luminance signal;

- generating the first output color signal comprises generating the first output color signal (R) based on the formula $$R = (sY + 407 * (C_r - 128))/255$$

wherein Cr represents the first chromaticity signal;

- generating the second output color signal comprises generating the second output color signal (G) based on the formula $$G = (sY - 207 * (C_r - 128) - 100 * (C_b - 128))/255;$$

wherein Cb represents the second chromaticity signal; and

- generating the third output color signal comprises generating the third output color signal (B) based on the formula $$B = (sY + 515 * (C_b - 128))/255.$$

23. An apparatus for processing a plurality of color values, the apparatus comprising:
- a first circuit coupled to input a control signal and coupled to input a first source color value when the control signal has a first state and a second source color value when the control signal has a second state, the first circuit generating a modified source color value based on the first source color value when the control signal has the first state, the first circuit performing a first stage of converting the second source color value from a first color space to a second color space when the control signal has the second state; and
- a second circuit coupled to input the modified source color value, a destination color value, and the control signal, the second circuit outputting a blended color value based on the modified source color value and the destination color value when the control signal has the first state, the second circuit performing a second stage of converting the second source color value from the first color space to the second color space when the control signal has the second state.

24. A computer system, comprising:
- a processor;
- a memory coupled to the processor; and
- a display adapter coupled to the processor and the memory, the display adapter including:
  - a first circuit coupled to input a control signal and coupled to input a first source color value when the control signal has a first state and a second source color value when the control signal has a second state, the first circuit generating a modified source color value based on the first source color value when the control signal has the first state, the first circuit performing a first stage of converting the second source color value from a first color space to a second color space when the control signal has the second state; and
  - a second circuit coupled to input the modified source color value, a destination color value, and the control signal, the second circuit outputting a blended color value based on the modified source color value and the destination color value when the control signal has the first state, the second circuit performing a second stage of converting the second source color value from the first color space to the second color space when the control signal has the second state.

* * * * *